UNITED STATES PATENT OFFICE.

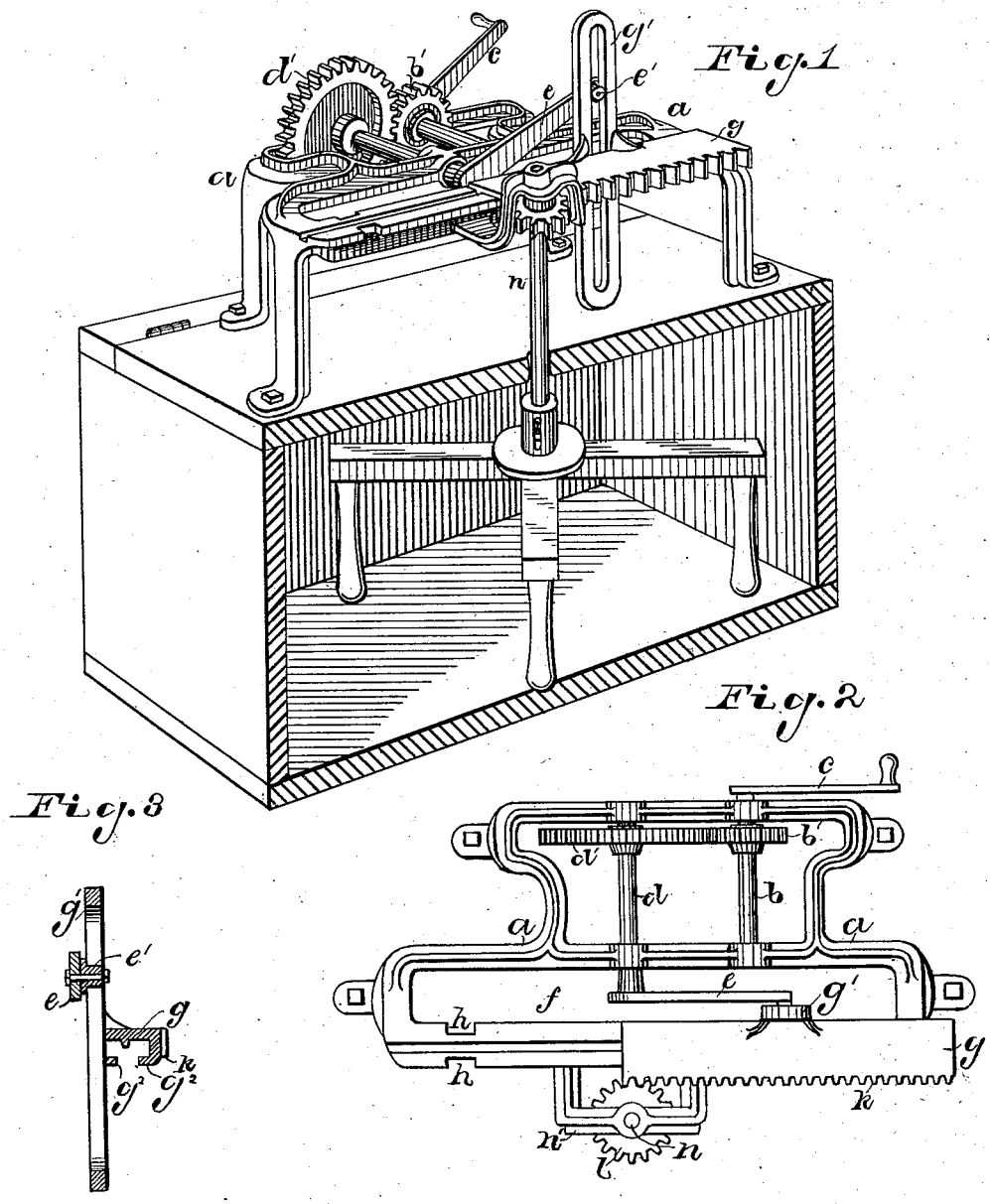

JONAS S. SHIRK, OF COLUMBUS, KANSAS.

POWER-CONVERTER.

SPECIFICATION forming part of Letters Patent No. 336,265, dated February 16, 1886.

Application filed December 17, 1885. Serial No. 185,998. (No model.)

*To all whom it may concern:*

Be it known that I, JONAS S. SHIRK, a citizen of the United States, residing at Columbus, in the county of Cherokee and State of Kansas, have invented certain new and useful Improvements in Power-Converters, of which the following is a specification.

My invention relates to that class of power-converters by which a continuous rotary motion is converted into an intermittent or alternating revolving motion in opposite directions.

The object of my invention is to provide a device in which the change in revolution of the shaft from one direction to the other is accomplished without any sudden jars or shocks, no matter at what speed the power be applied.

My invention consists in the constructions and combinations of parts hereinafter described and claimed.

In the accompanying drawings, Figure 1 is a perspective view of a device embodying my invention, showing the manner of applying the same to a washing-machine or churn, for which it is particularly adapted. Fig. 2 is a plan view of the same removed, and Fig. 3 is a detailed sectional view, referred to hereinafter.

Like parts are indicated by similar letters of reference throughout the several views.

In said drawings, $a\ a$ represent the main frame, on which the various working parts are supported. $b$ is the driving-shaft, which is supported in suitable bearings on the frame $a\ a$, and to which the power is applied by the crank $c$ or in any other suitable manner. Secured on the driving-shaft $b$ is a pinion, $b'$, which meshes with a spur-gear, $d'$, on a shaft, $d$. The shaft $d$ is also supported in bearings on the frame $a\ a$, parallel with the shaft $b$. On the forward end of the shaft $d$ is secured a crank, $e$, adapted to revolve with said shaft through an opening, $f$, in the frame $a\ a$. The crank $e$ is provided on its outer end with a roller, $e'$, which is adapted to work in a slotted arm or yoke, $g'$, on a reciprocating slide, $g$. The slide $g$ is adapted to reciprocate on a bearing, $x$, on the frame $a\ a$, which bearing is formed in cross-section of a T shape, the slide being provided with projections $g^2\ g^2$, which engage under the side flanges of the said bearing $x$. These projections $g^2\ g^2$ are preferably located in the center of the slide $g$, opposite the slotted arm or yoke $g'$, and are sufficiently short to pass through openings $h\ h$ in the sliding bearings $x$, which are provided therein at one end for this purpose. These openings furnish the means for removing and replacing the slide in its position on the frame-bearing. The openings $h\ h$ are preferably so placed that when the slide is in its normal position, with the roller $e'$ in the slotted arm $g$, the slide will be limited in its longitudinal motion, so that the projections $g^2\ g^2$ will not come opposite the said openings $h\ h$. On the under side of the slide $g$ is a V-shaped ledge adapted to reciprocate in a correspondingly-shaped slot in the bearing $x$. The slide will thus be held securely against lateral movement on its bearings. By disconnecting the roller $e'$ from the slotted arm $g'$ the slide may be moved along its bearing until the projections $g^2$ come opposite the openings $h\ h$. The slide may then be removed. The slide $g$ is provided on its forward edge with a rack, $k$, adapted to engage with a pinion, $l$, secured on an upright shaft, $n$. This shaft $n$ is journaled and supported in suitable bearings, $n'$, on the main frame $a\ a$, and is connected directly to the device or machine it is intended to drive. It will be seen now that as the handle $c$ is turned, thus revolving the shaft $b$, the power will be transmitted through the gears $b'$ and $d'$ to the shaft $d$. The crank $e$ on said shaft will thus be revolved, and, by means of the roller $e'$ on said crank engaging in the slotted arm $g'$, will cause the said slide $g$ to reciprocate on its bearings on the frame $a\ a$. As the slide moves back and forth on its bearings, the rack $k$ thereon, engaging with the teeth of the pinion $l$, causes the shaft to be revolved alternately in opposite directions. By the use of the crank $e$, in connection with the slide with the rack and pinion, it will be seen that the slide will be moved faster at the middle of its stroke and gradually decrease in speed as it approaches either end thereof until, at the limit of the stroke, the slide remains at rest while the crank is passing the centers. The speed of the driven shaft is thus correspondingly varied, so that the revolution thereof is reversed without any jar or shock.

It is obvious that this device admits of various modifications. Instead of having the slotted arm $g'$ on the slide $g$, the connection between the crank $e$ and the said slide could be established by means of a pitman adapted to connect with suitable wrist-pins on the said crank and slide. The shaft $b$ and gears may be dispensed with entirely by placing the handle $c$ directly on the shaft $d$, and thereby increase the speed of the driven shaft, with a corresponding decrease in power. The speed of the driven shaft may be also varied by varying the length of the crank $e$.

By having the frame cast in a single piece and adapted to support all the working parts thereon the device is rendered very strong and compact.

This device is particularly adapted for driving churns or washing-machines, though it may be used for various other purposes for which it is applicable.

Having thus described my invention, I claim—

1. The combination, with a driving-shaft adapted to be revolved in a constant direction, of a crank on said shaft, a reciprocating slide connected to said crank, and a driven shaft connected to said reciprocating slide and adapted to be alternately revolved thereby in opposite directions, substantially as set forth.

2. The combination, with the driving-shaft having the revolving crank thereon, of the reciprocating slide provided with the slotted arm or yoke, in which said crank is adapted to engage, a rack on said shaft, and a pinion on the driven shaft adapted to engage said rack, substantially as specified.

3. The combination, with a driving-shaft, the crank thereon, the slide and rack adapted to be reciprocated by said crank, and a driven shaft provided with a pinion engaged by said rack, of the main frame cast in a single piece with bearing for said slide and shaft, respectively, substantially as and for the purpose set forth.

4. The combination, with the revolving crank and the reciprocating slide connected thereto, said slide being provided with the hooked-shaped projections on the under side thereof, of the bearings on the main frame, provided with the openings $h\ h$ therein, substantially as set forth.

5. The combination of the handle $c$, shafts $b$ and $d$, gears $b'$ and $d'$, crank $e$, roller $e'$, slide $g$, having slotted arm $g'$, rack $k$, pinion $l$, and shaft $n$, substantially as specified.

In testimony whereof I have hereunto set my hand this 7th day of December, A. D. 1885.

J. S. SHIRK.

Witnesses:
E. A. CREWSON,
S. P. MITCHELL.